Figure 7:
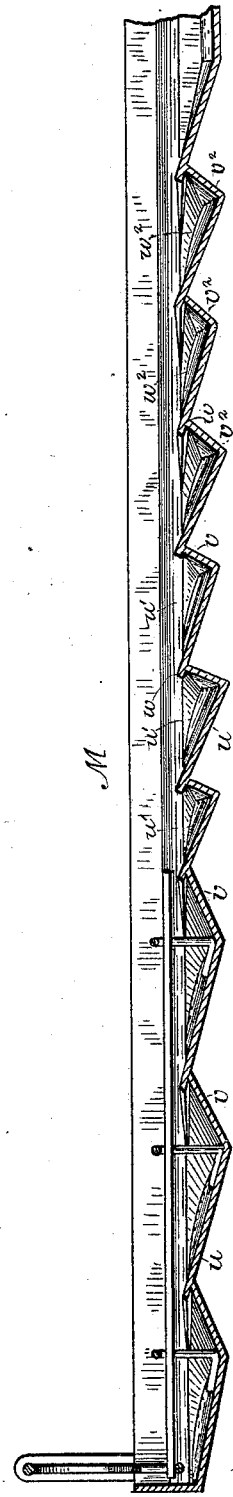

(No Model.) 3 Sheets—Sheet 1.
M. T. VAN DERVEER.
ORE CONCENTRATOR.
No. 398,475. Patented Feb. 26, 1889.
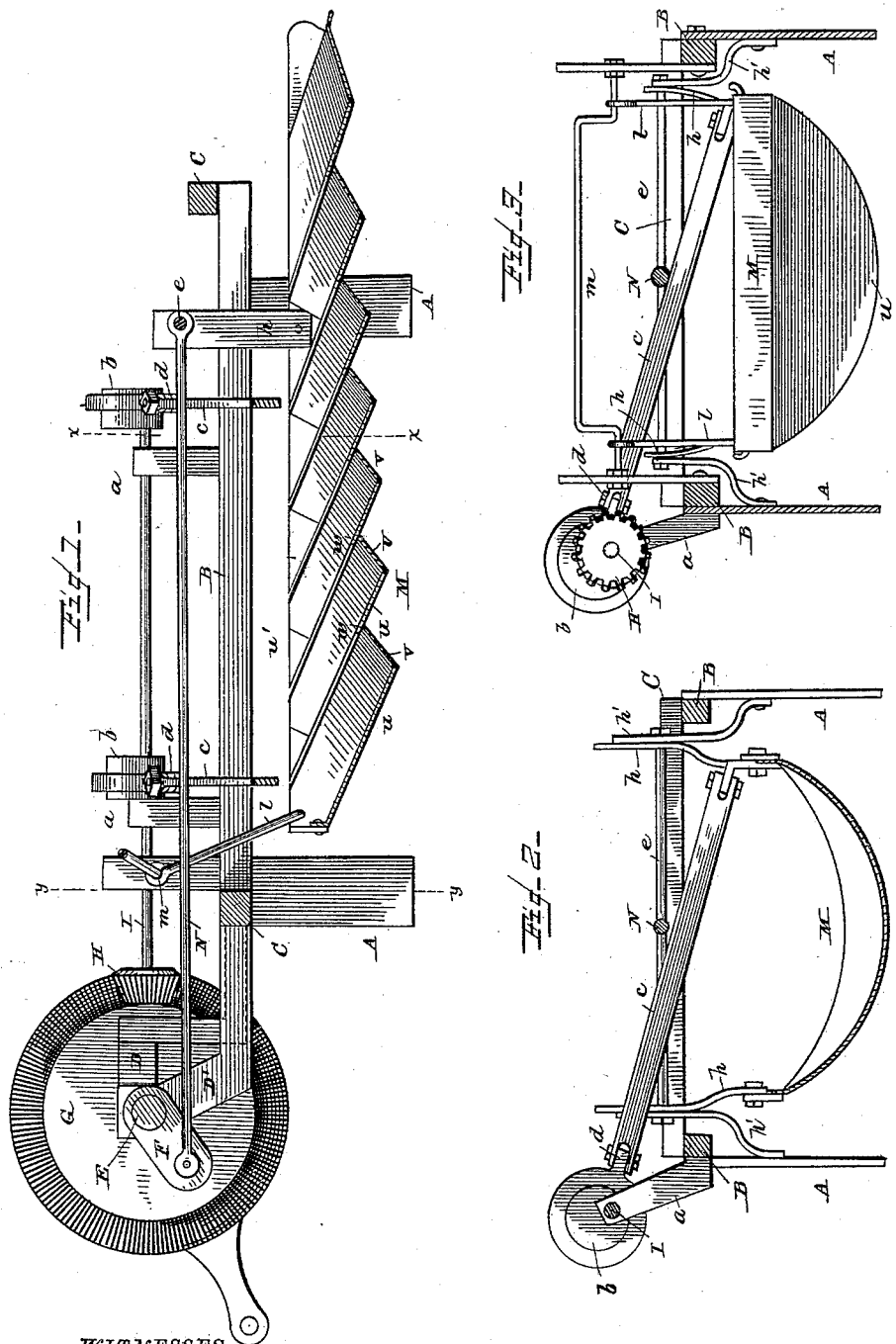
WITNESSES
Edwin L. Yewell,
J. F. Beale.
INVENTOR,
Milton T. Van Derveer,
By W. A. Redmond
His Attorney.

(No Model.) 3 Sheets—Sheet 2.
M. T. VAN DERVEER.
ORE CONCENTRATOR.
No. 398,475. Patented Feb. 26, 1889.
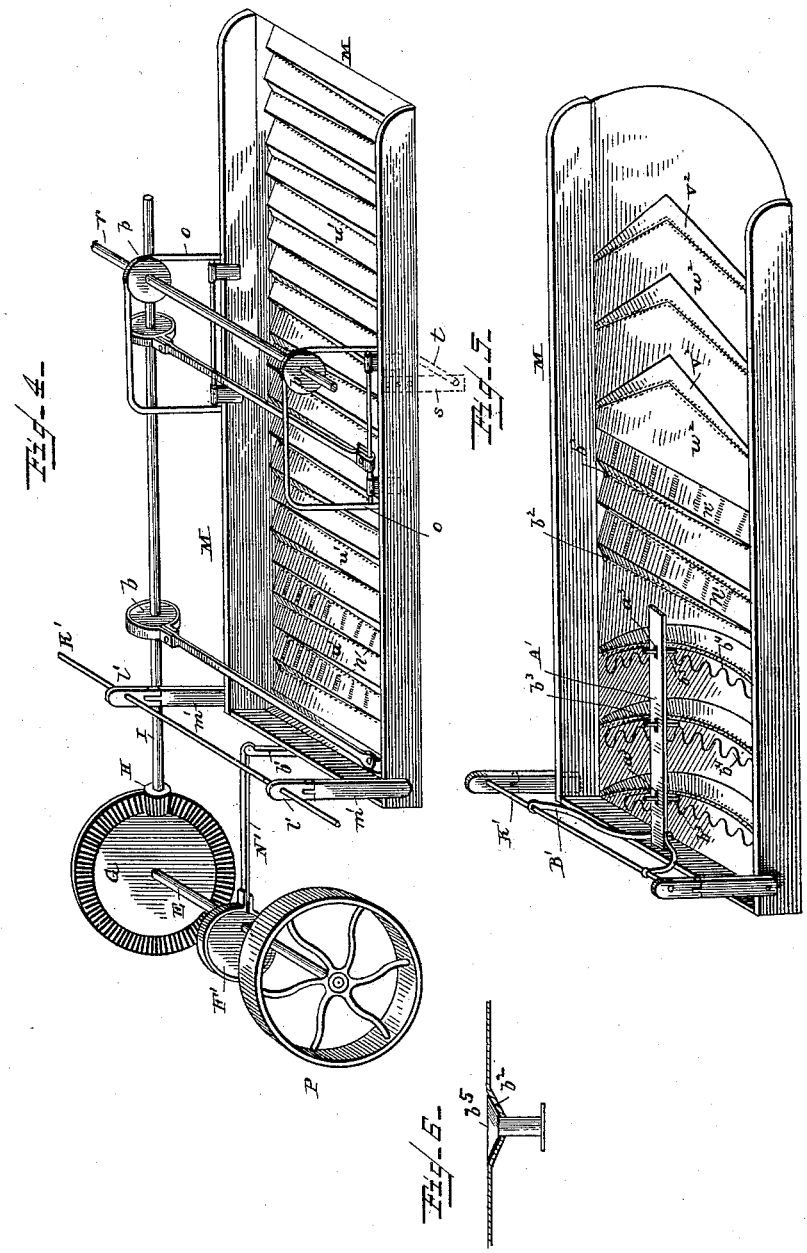
WITNESSES
Edwin L. Yewell.
J. F. Beale.
INVENTOR
Milton T. Van Derveer.
By W. A. Redmond
His Attorney (No Model.) 3 Sheets—Sheet 3.

M. T. VAN DERVEER.
ORE CONCENTRATOR.

No. 398,475. Patented Feb. 26, 1889.

ATTEST.
Victor J. Evans.
M. A. Redmond.

INVENTOR.
Milton T. Van Derveer,
By W. A. Redmond
Atty.

UNITED STATES PATENT OFFICE.

MILTON T. VAN DERVEER, OF AMSTERDAM, NEW YORK.

ORE-CONCENTRATOR.

SPECIFICATION forming part of Letters Patent No. 398,475, dated February 26, 1889.

Application filed June 25, 1887. Serial No. 242,439. (No model.)

*To all whom it may concern:*

Be it known that I, MILTON T. VAN DERVEER, a citizen of the United States, residing at Amsterdam, in the county of Montgomery and State of New York, have invented certain new and useful Improvements in Ore-Concentrators; and I do hereby declare the following to be a full, clear, and exact description of the invention, such as will enable others skilled in the art to which it appertains to make and use the same.

It is found that the most perfect and successful method of concentrating metalliferous sand or pulp is that known as "hand-washing" or "panning," which, as well known, consists in the agitation of a small quantity of ore or sand mixed with water in a shallow pan until the particles of greatest specific gravity settle in the bottom of the pan and the lighter worthless dirt and sand are carried over the wall of the pan with the water, which is gradually sloughed off. This operation, being carried out by hand, is necessarily a tedious, slow, and laborious one, only a very small proportion of a ton of ore or sand being capable of treatment by one person in the course of a day, and consequently where the dirt is "poor" or contains but a small quantity of valuable metal it does not afford sufficient compensation for working it by this method. It is also believed that the peculiar movement given the pan by the miner has a great deal to do with the highly-satisfactory result attained in the matter of saving the mineral by panning, and I have therefore devised a machine which will transmit this peculiar movement to a concentrating-surface, comprising a series of pans of novel construction, and which will perform the operation of panning continuously and thoroughly and treat a very large quantity of ore in a day, and by which much valuable mineral which is now wasted may be saved.

My invention consists in a vanning-surface composed of a continuous series of pans, each of said series having an inclined bottom, ends, and sides, forming depressions or "riffles," and to which a vibratory movement is imparted both longitudinally and laterally, and also in their longitudinal movement a gradual rising-and-falling motion, the whole being similar to the movement given the pan by the miner in hand-washing. This movement causes the heavier particles of the material under treatment, or those of the greatest specific gravity, to gravitate toward the corners or in the ends of the first pan of the series, and those of less gravity to be carried or sloughed over with the water and dirt into the next pan of the series, where they are again treated, and so on to the last pan of the series, where the worthless matter is sloughed off. Thus the very heaviest material is collected in the first or second pans at the feed end of the machine and the next heaviest in the third or fourth, and so on down to the end, where the lightest mineral is caught.

In the accompanying drawings, forming a part of this specification, Figure 1 is a longitudinal section of one form of my machine; Fig. 2, a cross-section on the line $x\,x$, Fig. 1; Fig. 3, a like section on the line $y\,y$, same figure, shaft I being shown in full with pinion H thereon; Fig. 4, a perspective view showing a modified form of the vanning-surface; Fig. 5, a perspective view of another modification of the vanning-surface; Fig. 6, a detail view; Fig. 7, a vertical section through the pan shown in Fig. 5.

Similar letters refer to similar parts throughout the several views.

The supporting-frame for my machine may be of any desired material and construction, that shown, Figs. 1, 2, and 3, consisting of the longitudinal side beams, B, and the end cross-beams, C, rigidly secured together to form a rectangular frame, which is suitably supported on legs A. As shown in Fig. 1, an inclined supporting-arm, D, springs from one of the side beams, B, to form a bearing for one end of the driving-shaft E, the other end of said shaft being supported by an inclined arm, D', projecting from the cross-beam C at a point slightly to one side of the center of the cross-beam. On one end of this shaft is mounted a large bevel gear-wheel, G, and on the other end, which terminates at about the center of the cross-beam, a crank, F, is secured. Meshing with the bevel-wheel G is a bevel-pinion, H, which is secured on one end of a longitudinal shaft, I, having its bearings in arms $a$, projecting from the side beams, B. This shaft carries eccentrics $b$, to the rings of which rods $c$ are attached by means of coupling-joints $d$, which permit of a free lateral movement of the rods. The other ends of these rods are secured by similar couplings to the side of the vanning-pan M or to lugs projecting therefrom. To a pin on the crank F one end of a rod, N, is attached, the other end being attached to a cross-bar, $e$, located near the discharge end of the pan and secured to the upper ends of arms $h\ h'$, the arms $h$ being rigidly secured at their lower ends to the sides of the vanning-pan M, while the lower ends of arms $h'$ are pivoted to the frame of the machine. The front or feed end of the pan is supported by hangers $l$, loosely attached at their upper ends to a cross-bar, $m$, having a bend at each end to prevent the hangers slipping too far along it, and at their lower ends pivoted or otherwise loosely connected to the sides of the pan. Thus it will be seen that the pan is hung or supported so as to permit of a longitudinal, a lateral, and a rising-and-falling movement when the shaft E is rotated. In fact, it may be said that the pan receives a combined longitudinal and lateral movement, and at the same time, and owing to these movements—or, in other words, to the fact that the pan is deflected from a straight line in its longitudinal movement by the lateral movement imparted by the rods $c$—it is made to describe an ellipse in addition to its rise and fall, this last-named movement resulting from the manner in which the pan is hung—namely, by hangers $e$, pivoted to the rigid or immovable rod or shaft $m$ at one end and by the rods $h\ h'$ at its other end—whereby when the pan is moved the hangers will be thrown out of a vertical line and the pan raised at one end and lowered at the other. These motions are given by the application of any desired power to the gear-wheel G, and by it imparted to shaft I through pinion H, and to the rods $c$ by eccentrics $b$, while the crank F moves the rod N back and forth.

Referring now to Fig. 4, it will be seen that I modify the above-described construction so as to secure a more pronounced or positive rise and fall of the pan. In this view the shaft E is extended across the feed end of the machine and carries an eccentric, F', at about its center, and a pulley, P, on the end opposite the gear-wheel G. To the ring of the eccentric a short shaft, N', is attached, which is pivoted to a rod, $b'$, projecting upwardly from the end of the machine.

The front or feed end of the machine is supported by means of hangers $l'$, mounted on a shaft or bar, K', extending across the machine and suitably supported in bearings in the frame. (Not shown.) The lower ends of these hangers $l'$ are coupled or pivoted to uprights $m'$, secured to the pan M, so as to permit a free lateral movement of the pan, while they turn on the rod K', as on pivots, to allow of the longitudinal movement. Near the discharge end the pan is supported by means of bails $o$, hinged at their ends to the side of the pan. These bails run on sheave-pulleys $p$, suitably mounted on a shaft, $r$, extending across the machine and supported from the frame thereof, so that the bails may move back or forth and tip or dip on the sheaves when the pan is moved longitudinally, and also swing laterally thereon when the side oscillation is given the pan. As shown in dotted lines in Fig. 4, the same object—dipping of the pan—may be attained by pivoting the upper end of the standards $s$ to the pan and their lower ends to a suitable supporting-bar, $t$, below the pan. This dipping movement causes the top layer or slum to slide off or over the walls of the depression from one to another in a somewhat different but equally effective manner from that first described.

The vanning-surface M, which, for convenience, is called herein a "pan," consists of a series of shallow depressions formed in and across the pan, the bottoms of which are inclined or shelving and the sides or walls inclining from the point at which they meet the bottom. In Figs. 1, 2, and 3 and the first three depressions in Fig. 5 I show one form of depression. In these figures the bottoms $u$ of the depressions shelve or incline toward the discharge end of the pan, and the bottom of each depression projects slightly beyond or over the wall $v$ of the next preceding depression, as at $w$, said walls and bottoms being curved or crescent-shaped and the depressions being deepest at their central points and gradually tapering to their extremities. The walls $v$ stand at an angle from the bottoms $u$, so that such of the material as is heavy enough to sink to the bottom may be caught by the projecting edge $w$, and not worked over by the agitation of the pan into the next depression, while the lighter material will readily pass over the edges $w$ until it reaches a depression where it may sink, the worthless material in the meantime being gradually sloughed off over the edges $w$ and out of the pan at the end.

In Fig. 4 I show a series of depressions which will perform the same function as those above described in quite as satisfactory a manner. In this figure the depressions $u'$ are arranged straight across the pan and incline alternately from each side of the same, so that every alternate depression on each side at the ends of the depression will be deeper than the intervening depression on the same side, thus forming pockets for the reception of the valuable mineral, which will, after entering a depression, gravitate toward the deeper end or pocket and there collect.

In Fig. 5 I show a pan in which both forms of depressions already described are embraced, and in addition thereto depressions having bottoms $w^2$ somewhat greater in width, and having their walls $v^2$ extending at an angle from the sides of the pan and meeting at their centers to form V-shaped compartments or depressions. If desired, grooves or corrugations $n'$ may be formed in the bottoms of the depressions, the better to facilitate the progress of the separation by guiding any metal that may find its way into them to the lowest points of the depressions.

All of the depressions above described may be provided with perforations, as indicated by the dots therein; or, as found desirable, the perforations may be omitted from all or some of them. Through these perforations the concentrates may pass into any suitable receptacle beneath the pan. When it is desired to treat or "work over" material which has once been treated in an amalgamator by my machine, I provide in the corners of the depressions, or at other suitable points therein, the countersunk openings $b^2$, provided with the metal valves $b^5$, preferably copper; but any other metal to which mercury will adhere may be used to stop the free passage of the water and sands and to collect the metals known as "refractory" or otherwise, or fine or flour of mercury which may have escaped in the preceding treatment, and thereby combine or amalgamate or unite into a mass sufficient to float the valve and allow the amalgam to pass through into any suitable receptacle beneath.

In many instances in the operation of ore-concentrators it is found necessary to have some form of stirrers or rakes in order to assist in the separation of the ore or sands by agitating the contents of the pan to prevent a tendency of the same to fill with heavy ore and sands, and thus impede or obstruct the effectual operation of the machine.

In Fig. 5 I show a device partly broken away, which has given great satisfaction in my experiments. $A'$ is a rod loosely supported by bars $B'$ from the shaft $K'$, and having openings $a^3$ formed therein, one over each depression, through which bars $b^3$ are passed and pivoted, so that they may move with the pan in its longitudinal movement, but not in its lateral movement. At their lower ends these bars $b^3$ are provided with wire rakes or stirrers $b^4$, bent to conform to the shape of the depression they occupy, and also corrugated to form the teeth of the rake, so that the ore and sand will be thoroughly agitated by the rakes as the pan is moved.

If desired, the rakes may be so hung as to vibrate or be given a movement opposite to or against the side oscillation of the pan.

Having thus described my invention, what I claim as new, and desire to secure by Letters Patent, is—

1. The vanning-pan provided with a series of depressions extending across the pan, each depression having an inclined side, $v$, and a shelving bottom, $u$, which laps over the side of an adjoining depression, said depressions being deepest at the center and gradually decreasing in size therefrom and curving upward to ends of the depressions, substantially as described, for the purpose set forth.

2. The combination, in an ore-concentrator, of a pan having a series of pockets or depressions, with inclined bottoms and countersunk openings in said bottoms, valves of metal of less specific gravity than mercury fitted loosely in said openings, and suitable mechanism for imparting longitudinal and lateral vibration to said pan, substantially as described, for the purpose set forth.

3. In combination with a vanning-pan provided with vibrating mechanism and loosely supported at one end by hangers, a reciprocating rod, N, a cross-bar, $e$, with arms $h\ h'$, secured thereto at their upper ends, the lower ends of arms $h$ being rigidly secured to the pan and arms $h'$ being pivotally connected with the frame, substantially as described, for the purposes set forth.

4. In an ore-concentrator, a vibrating vanning-pan having a series of depressions, each of which has an inclined side wall, and an inclined or shelving bottom provided with grooves or corrugations and a series of perforations, substantially as described.

5. The combination, with a vanning-pan having a series of depressions with inclined bottoms and sides, and mechanism for imparting a longitudinal and lateral vibration to said pan, of a horizontal rod and a series of stirrers conforming to said depressions secured to said rod, so as to follow the longitudinal movement of the pan, substantially as described.

6. In an ore-concentrator, a vanning-pan having a series of depressions, each of which has an inclined side wall and an inclined or shelving bottom which extends over and beyond the wall of the adjoining depression, and said depressions having each a varying depth, in combination with the mechanism for vibrating the pan longitudinally, laterally, and with a rising-and-falling movement, substantially as described.

7. A vanning-pan having a series of depressions, each depression having an inclined side and a shelving bottom that overlaps the side of the adjoining depression, said depressions being deepest at the center and decreasing in size therefrom toward their ends, in combination with a series of stirrers conforming in shape and arrangement to said depressions, substantially as described.

In testimony whereof I affix my signature in presence of two witnesses.

MILTON T. VAN DERVEER.

Witnesses:
LAWRENCE A. SERVISS,
JOHN F. COLLINS.